March 13, 1951　　　D. G. TAYLOR　　　2,545,056
CONTROL DEVICE
Filed Aug. 25, 1947　　　2 Sheets-Sheet 1
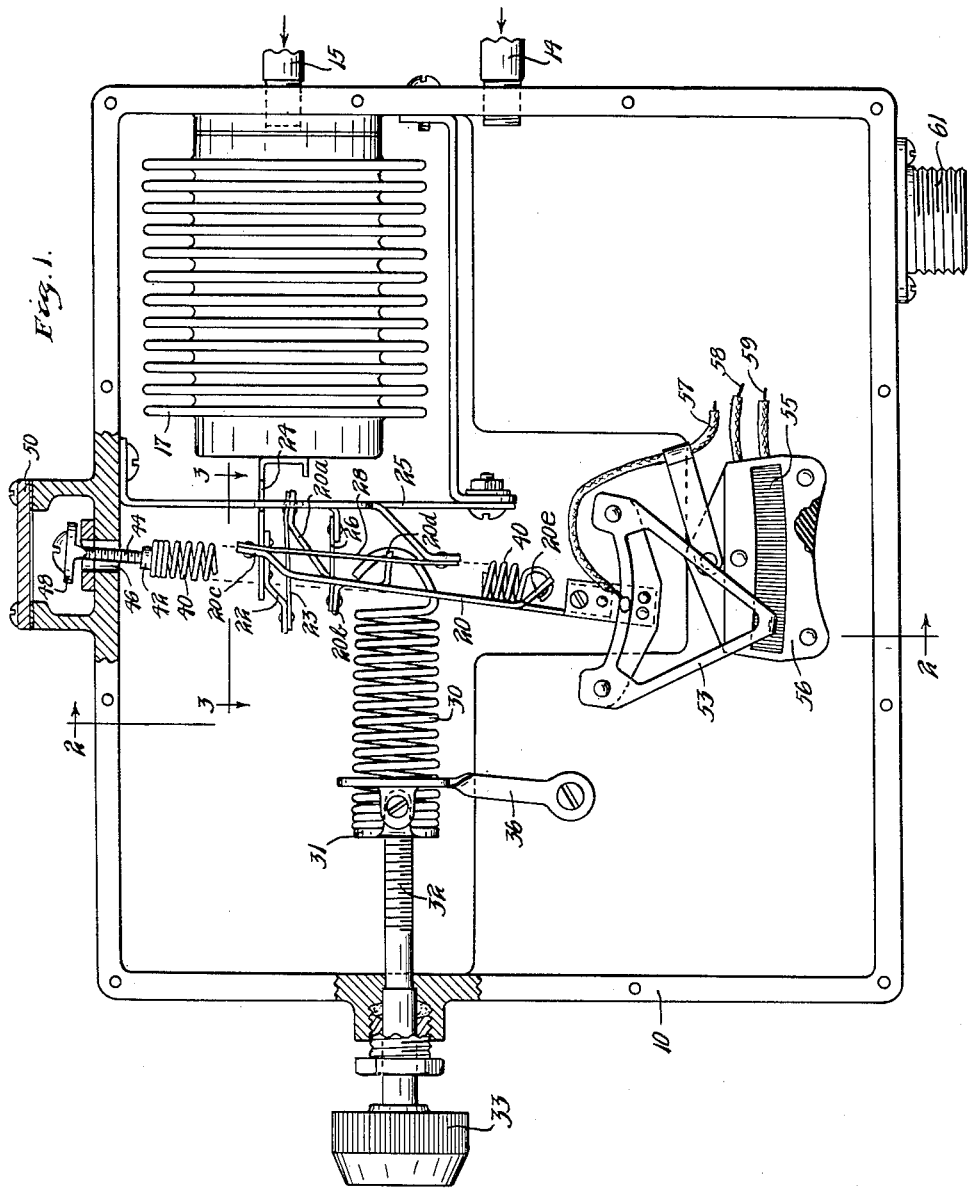
INVENTOR.
DANIEL G. TAYLOR
BY
George N. Fisher
ATTORNEY

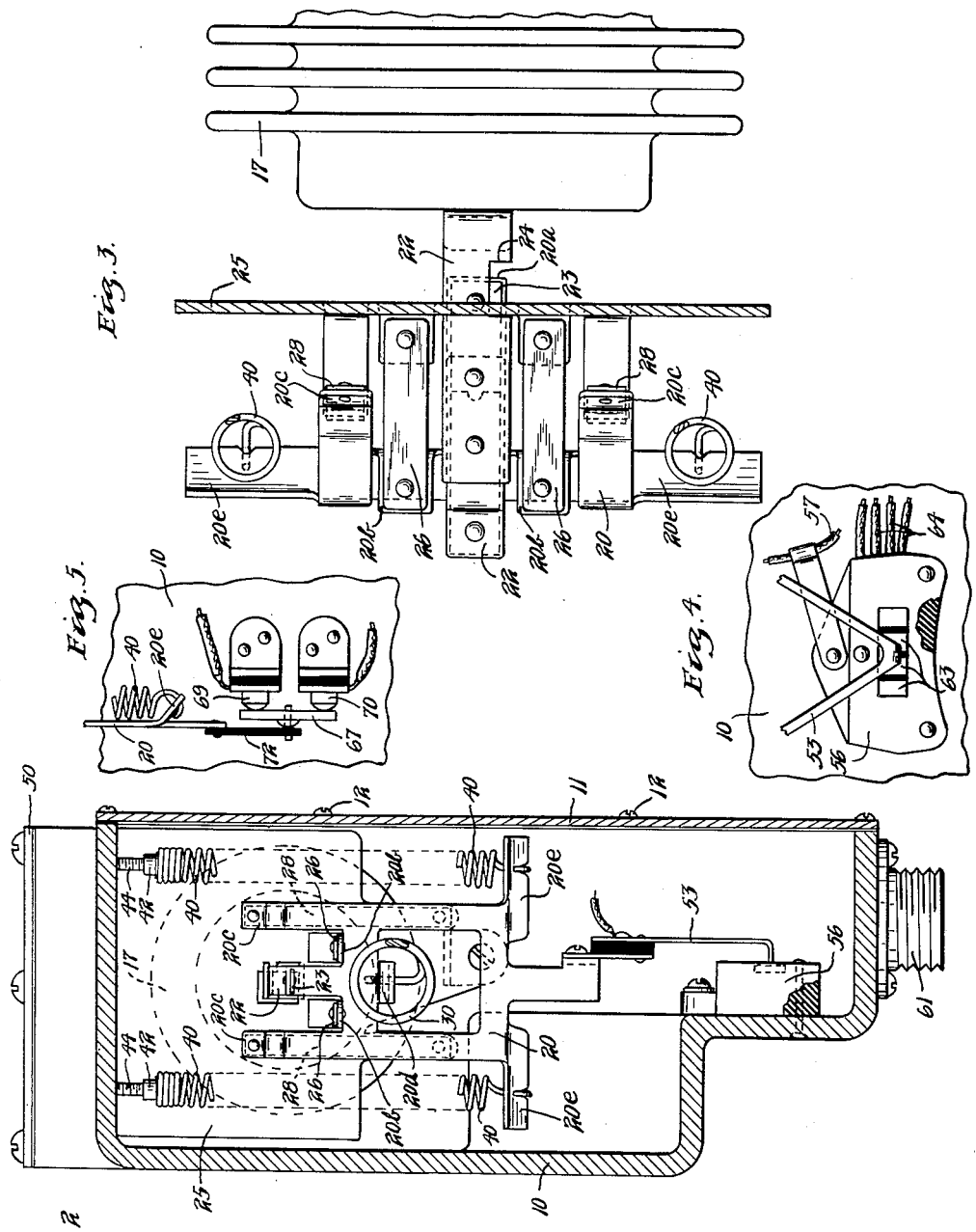

Patented Mar. 13, 1951

2,545,056

UNITED STATES PATENT OFFICE 2,545,056

CONTROL DEVICE

Daniel G. Taylor, Minneapolis, Minn., assignor to Minneapolis-Honeywell Regulator Company, Minneapolis, Minn., a corporation of Delaware Application August 25, 1947, Serial No. 770,339

13 Claims. (Cl. 200—83)

1

This invention relates to control devices in which a switch or similar element is actuated by changes in a variable condition, and has particular reference to a pressure responsive control device that is very sensitive even though adapted to control relatively high pressures. Certain aspects of the invention are directed to details of the mechanical linkage and switching mechanism.

An object of the invention is to provide a control device, for example a pressure responsive switching mechanism, in which the spring rates of various components are compensated by a spring acting through a variable lever arm.

Another object is to provide a control device in which certain of the parts are interconnected by flexible strands that serve as substantially frictionless pivots.

A further object is to provide a substantially frictionless linkage suitable for incorporation in a control device or indicator.

Another object is to provide a very sensitive snap action switch in which certain parts are connected together on substantially frictionless pivots.

Other objects will be apparent from the specification and the drawing, in which:

Figure 1 is an elevation, partly in section, of a pressure responsive control device with the cover removed.

Figure 2 is a section taken on line 2—2 of Figure 1,

Figure 3 is a fragmentary section taken substantially on line 3—3 of Figure 1,

Figure 4 is a fragmentary view of a modified form of switching means, and

Figure 5 is a fragmentary view of a further modification of the switching means.

The particular control device to be described is one that responds to the difference in pressures applied to the interior and exterior of a flexible bellows. The bellows acts on a pivoted lever for positioning suitable control means, and a spring is employed to oppose expansion of the bellows. Flexible strands are employed to pivot the lever in the frame and as a pivotal connection between the lever and the bellows.

In order to increase the sensitivity of the device a compensating spring is employed and is so connected to the lever that its effect in tending to rotate the lever varies as the lever is pivotally moved and has the effect on the lever of a spring having a negative spring rate. Mechanisms of this type are disclosed in Fulton 987,712 and in Grooms 2,189,663 and the principle of spring rate compensation is well discussed there-

2 in. The present invention is directed in part to a pivotal support for a lever that finds particular utility in this type of device. Certain of the pivots for the lever are subjected to relatively high loading, and if the advantages of increased sensitivity are to be realized it is essential that friction be reduced to a minimum. The particular pivot means employed comprises one or more flexible strands which may be in crossed relation to establish a pivot point. In the interest of strength and reliability these strands may well be flat spring strips. If the strips are relatively heavy they will also introduce an appreciable spring rate into the mechanism, but since means is already provided for compensating the spring rates of the bellows and main spring it is possible to adjust the mechanism to compensate for the rates of the spring strips as well, without loss of sensitivity.

Where it is desired to operate a member rapidly as in the case of a snap acting switch the same mechanism may be employed but the compensating spring is adjusted so as to overcompensate for the other spring rates involved. Such arrangements are disclosed in Eggleston 1,841,326 and in my prior Patents Numbers 2,209,721 and 2,211,735. In this case also the use of flexible strands is particularly advantageous in that the resiliency of the strands may be cancelled out by the compensating spring while full advantage may be taken of the practically frictionless pivots thereby provided.

The illustrative embodiment of the invention is a differential pressure responsive control designed primarily to respond to the speed of an airplane and is to be connected to suitable static and dynamic pressure lines.

Referring now to the drawing a pressure tight casing 10 is provided with a cover 11 secured thereto by screws 12. A pressure connection 14 communicates with the interior of the casing and a pressure connection 15 communicates with the interior of a flexible metallic bellows 17 that is mounted within the interior of the casing 10.

A lever 20 is provided with an extension 20a that is connected to a bracket 22 extending from the free end of the bellows 17 by means of a flexible strand or flexible metal strip 23. The lever 20 is further provided with a pair of extensions 20b that are connected to a bracket 25, which is fixed with respect to the casing 10, by means of a pair of flexible strips 26. In order to form a rigid pivot for the lever 20 in the casing 10 the lever 20 is further provided with a pair of extensions 20c that are connected to the bracket 25 by means of a pair of flexible strips 28. When the lever 20 is normal to the axis of the bellows 17 the strips 23 and 26 will be parallel to each other and to the axis of the bellows and the strip 28 will be normal thereto. The lever 20 will be pivoted in the casing 10 on an axis formed approximately by the intersection of the flexible strips 26 and 28, and the lever 20 will be pivoted to the bellows 17 on an axis represented approximately by the intersection of the flexible strips 23 and 28. The bracket 22 may be notched as at 24 to engage the stationary bracket 25 to provide stops to limit movement of the bellows 17 and the lever 20.

The pressure within the bellows 17 is greater than the pressure within the casing 10 and therefore the bellows will tend to rotate the lever 20 in a counterclockwise direction. Movement of the lever 20 by the bellows 17 is opposed by a spring 30, the left hand end of which is secured to a nut 31 which is threaded on a screw 32. The force supplied by the spring 30 to the lever 20 may be adjusted by rotating the screw 32 by means of a knob 33 outside the casing 10. An arm 36 pivoted to the nut 31 and to the casing 10 prevents rotation of the nut 31 when the screw 32 is rotated. The spring 30 engages a portion 20d of the lever 20, and tends to rotate the lever 20 in a clockwise direction about its pivotal axis.

A pair of compensating springs 40 have their lower ends connected to extensions 20e of the lever 20 and their upper ends attached to nuts 42 that are threaded on a pair of screws 44. The screws 44 extend through opening 46 in the casing 10 and are pivoted in the casing 10 by means of washers 48 having knife edge projections for engaging suitable recesses in the casing 10. A removable pressure tight cover 50 is provided to permit adjustment of the screws 44 for varying the tensions of the springs 40. The springs 40 may be pivoted in the casing 10 through the screws 44 and knife edged washers 48 on an axis such that the springs 40 will be in a plane normal to the axis of the bellows and of the spring 30 when the lever 20 is also normal thereto. It will be seen that when the springs 40 are in this position they will have no effect on the position of the lever 20. However, as the lever 20 is pivoted in either direction from this position the effect of the springs 40 will be to move the lever to a position still further from the position it would assume if influenced only by the bellows 17 and the spring 30. By suitably adjusting the tension of the springs 40 the lever 20 will move through a given angle on a change in pressure within the bellows 17 that is much smaller than the change in pressure that would be required to move the lever the same amount without the effect of the springs 40 superimposed on the effect of the resilience of the spring 30, the resilience of the bellows 17, and the resilience of the spring strips 23, 26, and 28. When it is desired to have the movement of the lever 20 assume a predetermined relation to the change in pressure within the bellows 17 the springs 40 are adjusted so that they do not entirely compensate for the other spring rates of the device but only partly cancel out these spring rates. This effect is sometimes known as undercompensation. If the springs 40 were adjusted for 100% compensation, then for the condition in which the pressure in the bellows 17 just balances the force of the spring 30, the lever 20 could assume any position within its range of movement and no force would exist tending to move it from this position.

The lower end of the lever 20 has fixed thereto a flexible conducting member 53 that serves as the wiper arm of a potentiometer. The member 53 makes contact with the turns of a resistance winding 55 mounted in an insulating block 56 within the casing 10. Lead wires 57, 58 and 59 are connected to the member 53 and to the ends of the resistance winding 55 and may be led out of the casing 10 to a suitable pressure tight fitting 61. Because of the necessary friction between the member 53 and the wires 55 to insure a good electrical connection some difference in pressure within the bellows 17 will be required to move the lever 20 and the member 53 in opposite directions. The known frictional drag of the member 53 on the resistance winding 55 must be taken into account in selecting the bellows 17 so that it will have the proper effective area to take care of the known value of reversal loss of the potentiometer. In actual practice, where the device is used as an airspeed control on an airplane the normal vibration that exists in the airplane will have a tendency to free up the potentiometer and the reversal loss will be considerably less than would be the case with no vibration.

An alternative form of switching means is shown in Figure 4. In this case the member 53 wipes across a plurality of electrical contacts 63 which may be provided with suitable lead wires 64. In this case the operation of the device is exactly the same as in the first described modification with the exception that the number of steps of control available is reduced.

In Figure 5 a further modification of the device is shown, and in this case the lever 20 actuates a contacting bar 67 to bridge and unbridge a pair of electrical contacts 69 and 70 that are mounted in the casing 10 but insulated therefrom. The bar 67 is loosely mounted on an insulating strip 72 which is attached to the lever 20 so that good contact with each of the contacts 69 and 70 will be made. In order to insure a solid contact between the bar 67 and the contacts 69 and 70 it is desirable to provide for rapid movement of the bar 67 into and out of engagement with the contacts 69 and 70. To this end the springs 40 may be adjusted so that their tension is somewhat greater than in the case previously described so that the spring rate of the bellows 17, of the spring 30 and of the flexible strips 23, 26 and 28 will be "overcompensated." When the springs 40 are adjusted for overcompensation of the other spring rates of the device, the lever 20 will not remain in any intermediate position but will move the entire distance permitted once sufficient force is available to produce any movement at all. In this connection it should be noted that it is not essential that the springs 40 go "over center" and it is merely necessary that the negative spring rate effect produced by the springs 40 be greater than the various positive spring rates of the other portions of the device throughout the range of movement being considered. As in the case where the spring rates of the device are undercompensated, adjustment of the springs 40 to overcompensate the accumulated spring rates of the other portions of the device produces an operating differential. The pressure within the bellows 17 necessary to move the bar 67 to open the circuit will be somewhat less than the pressure required to reclose the switch. Therefore any desired operating differential may be obtained by adjusting the tension of the springs 40 within the range in which the springs 40 overcompensates the spring rate of the spring 30, the bellows 17 and the various flexible strips. The advantage of providing substantially frictionless pivots by the use of flexible strips is realized in this case in the same way as in the previously described modifications in that a control having a very low operating differential may be provided even though the flexible strips are fairly heavy and have considerable spring rate in themselves, since the spring rates of the various flexible strips is cumulative together with the spring rate of the spring 30 and the bellows 17 and are compensated for in the same manner.

In the interest of stability of the lever 20 the lever 20 has been made symmetrical about a plane passed through the axis of the spring 30 and the axis of the bellows 17. For this reason the springs 40 are also symmetrical with respect to this plane and are preferably adjusted to substantially the same tension. However their action on the lever 20 is the same as though a single spring had been provided lying in this plane. Also it will be noted that all of the flexible strips are in tension. The bellows 17 tending to rock the lever 20 counterclockwise through the spring strip 23 and the spring 30 tending to rock the lever 20 in a clockwise direction places the strips 23 and 26 in tension. The springs 40 tend to move the lever 20 in an upward direction as seen in Figures 1 and 2 and therefore strips 28 are in tension. Since all the spring strips are in tension there is no tendency for any of them to buckle and accurate positioning of the lever 20 is assured.

It will be understood that the various features of my invention could be used in numerous ways and therefore I desire to be limited only by the scope of the appended claims.

I claim:

1. In a sensing device, a support, sensing means, a lever connected to said support by a first flexible strand, a second flexible strand generally parallel to said first flexible strand connecting said lever to said sensing means, and a third flexible strand normal to said first two flexible strands connecting said lever and said support.

2. In a control device, a support, condition responsive means, a lever connected to said support by a first flexible strand, a second flexible strand generally parallel to said first flexible strand connecting said lever to said condition responsive means, a third flexible strand normal to said first two flexible strands connecting said lever and said support and control means actuated by said lever.

3. In a sensitive device, a support, sensing means, a lever connected to said support by a first flexible strand, a second flexible strand generally parallel to said first flexible strand connecting said lever to said sensing means, a third flexible strand normal to said first two flexible strands connecting said lever and said support, and biasing means acting between said support and said lever for maintaining all of said flexible strands in tension.

4. In a sensitive device, a support, sensing means, a lever connected to said support by a first flexible strand, a second flexible strand generally parallel to said first flexible strand connecting said lever to said sensing means, a third flexible strand normal to said first two flexible strands connecting said lever and said support, and a spring acting between said support and said lever.

5. A linkage comprising a support, an actuator, a lever connected to said support by a first flexible strand, a second flexible strand generally parallel to said first flexible strand connecting said lever to said actuator, and a third flexible strand normal to said first two flexible strands connecting said lever and said support.

6. A linkage comprising a support, an actuator, a lever connected to said support by a first flexible strand, a second flexible strand generally parallel to said first flexible strand connecting said lever to said actuator, and a third flexible strand normal to said first two flexible strands connecting said lever and said support, each of said first two flexible strands having a free length between its connections, and said third flexible strand lying in a plane that crosses said first two flexible strands at the free portions thereof.

7. In a control device, a support, resilient condition responsive means, a lever connected to said support by a first flexible strand, a second flexible strand generally parallel to said first flexible strand connecting said lever to said condition responsive means, a third flexible strand normal to said first two flexible strands connecting said lever and said support, a spring acting between said support and said lever and tending to rotate said lever on an axis determined by the intersection of said first and third flexible strands and placing said second flexible strand in tension to oppose said condition responsive means, and control means actuated by said lever.

8. In a control device, a support, resilient condition responsive means, a lever connected to said support by a first flexible strand, a second flexible strand generally parallel to said first flexible strand connecting said lever to said condition responsive means, a third flexible strand normal to said first two flexible strands connecting said lever and said support, a spring acting between said support and said lever and tending to rotate said lever on an axis determined by the intersection of said first and third flexible strands and placing said second flexible strand in tension to oppose said condition responsive means, control means actuated by said lever, and a second spring between said lever and said support for compensating the spring rates of said first spring and said condition responsive means.

9. In a control device, a support, resilient condition responsive means, a lever connected to said support by a first flexible strand, a second flexible strand generally parallel to said first flexible strand connecting said lever to said condition responsive means, a third flexible strand normal to said first two flexible strands connecting said lever and said support, a spring acting between said support and said lever and tending to rotate said lever on an axis determined by the intersection of said first and third flexible strands and placing said second flexible strand in tension to oppose said condition responsive means, control means actuated by said lever, and a second spring between said lever and said support for compensating the spring rates of said first spring and said condition responsive means, said second spring exerting its force on said lever in a direction to place said third flexible strand in tension.

10. In a control device, a support, condition responsive means, a lever connected to said support and to said condition responsive means by flexible strands, a pair of flexible strands connecting said lever and said support and lying in a plane that is normal to said first mentioned flexible strands at one position of said lever, a first spring acting on said lever to maintain said first mentioned flexible strands in tension and to oppose said condition responsive means, a second spring acting on said lever at substantially right angles to said first spring, and control means actuated by said lever.

11. A pressure actuated switch comprising, a support, a pressure responsive bellows, a lever connected to said support by a first flexible strand and connected to said bellows by a second flexible strand parallel to said first strand, a control point regulating spring parallel to said first and second strands and acting on said lever to oppose said bellows, a compensating spring acting on said lever substantially at right angles to said regulating spring, a third flexible strand connecting said lever and said support and lying in a plane at right angles to said first two strands, and contact means actuated by said lever.

12. A linkage comprising a support, an actuator, a lever connected to said support by a first flexible strand, a second flexible strand generally parallel to said first flexible strand connecting said lever to said actuator, and a third flexible strand connecting said lever and said support, each of said flexible strands having a free length, the free length of said third strand crossing the free lengths of each of said first two strands.

13. In a sensing device, a support, condition responsive means, a lever, flexible strands interconnecting said lever and said support and said lever and said condition responsive means, means on said support limiting pivotal movement of said lever to a predetermined range, a first spring acting on said lever to oppose said condition responsive means, and a second spring acting on said lever with a leverage that changes as said lever is pivotally moved to compensate the spring rates of said first spring and said flexible strands, the resulting force of said first and second springs on said lever placing said flexible strands in tension at all positions of said lever.

DANIEL G. TAYLOR.

REFERENCES CITED

The following references are of record in the file of this patent:

UNITED STATES PATENTS

| Number | Name | Date |
|---|---|---|
| 1,944,358 | McNamara | Jan. 23, 1934 |
| 2,189,663 | Grooms | Feb. 6, 1940 |
| 2,256,225 | Thompson | Sept. 16, 1941 |